Oct. 9, 1951 C. P. KARR 2,570,456
VALVE INDEXING MECHANISM
Filed May 6, 1947 3 Sheets-Sheet 1
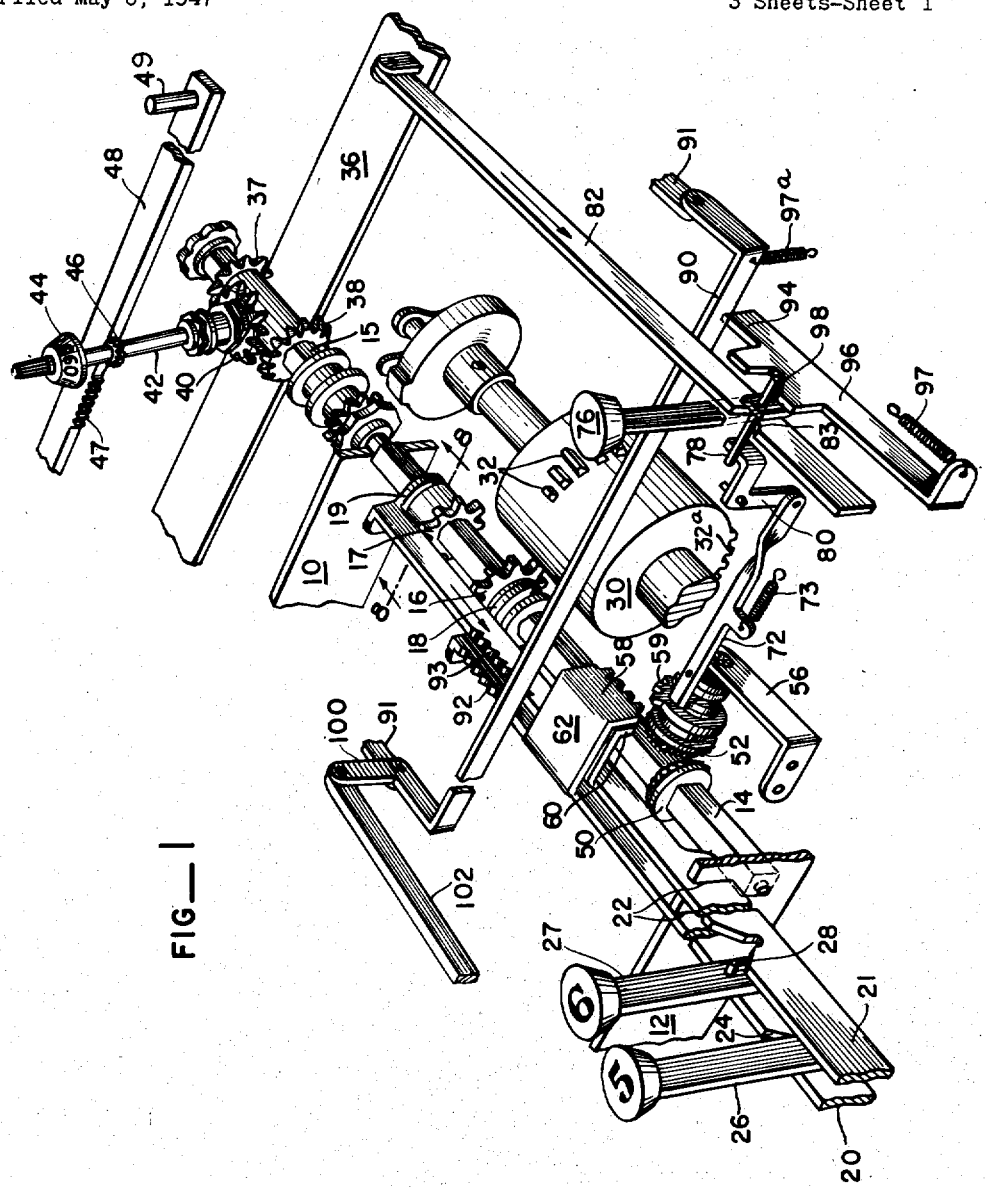
FIG—1
CLINTON P. KARR
Inventor
By Smith & Tuck
Attorneys

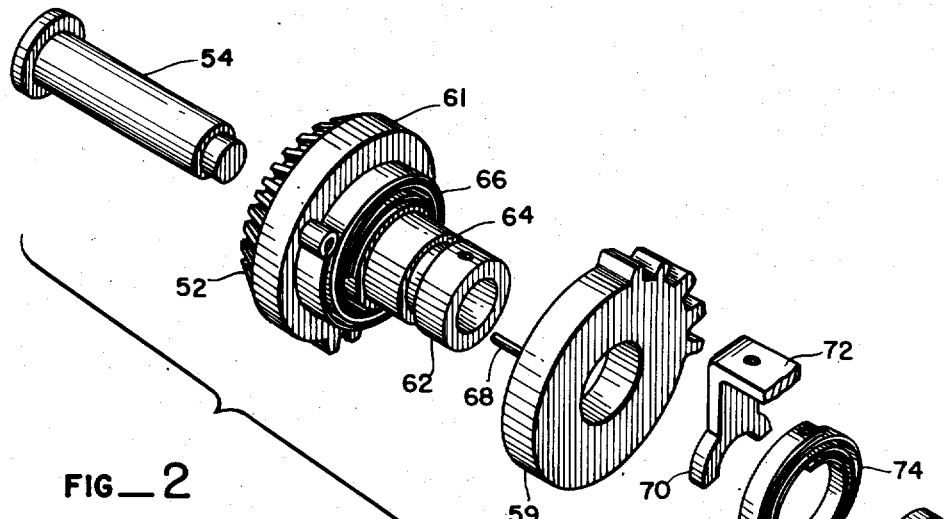
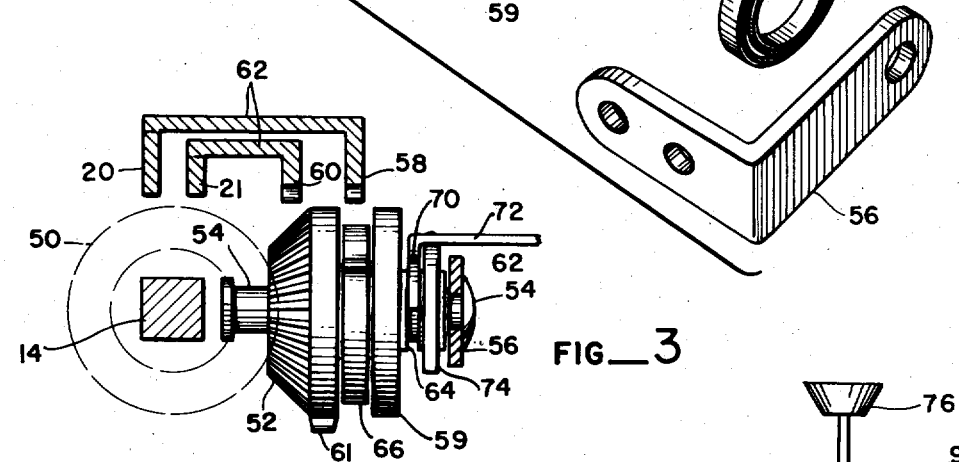
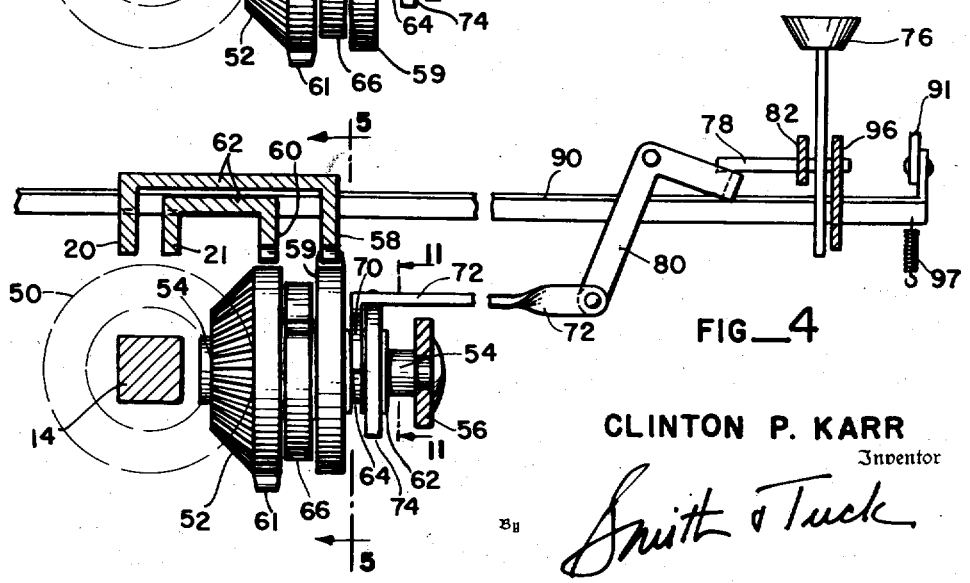

Oct. 9, 1951     C. P. KARR     2,570,456
VALVE INDEXING MECHANISM
Filed May 6, 1947     3 Sheets-Sheet 3
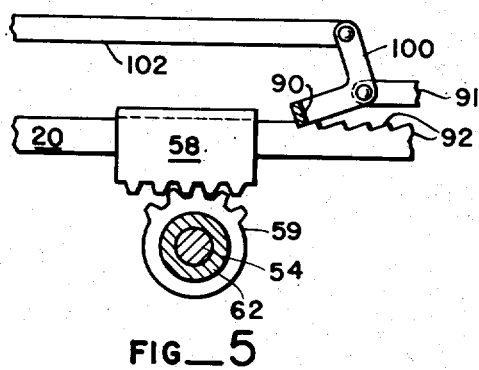
FIG_5
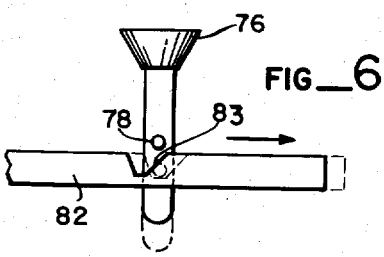
FIG_6
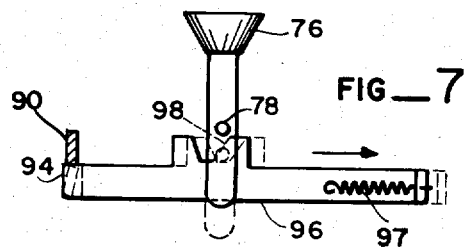
FIG_7
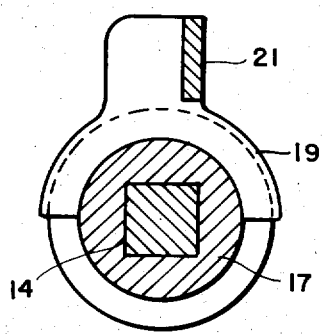
FIG_8
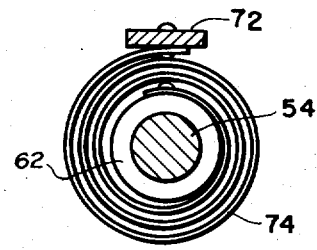
FIG_11
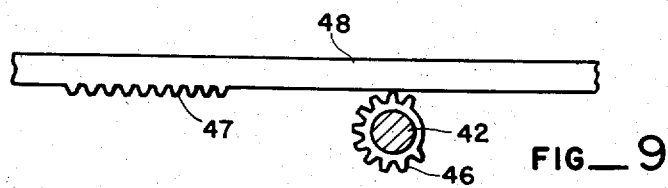
FIG_9
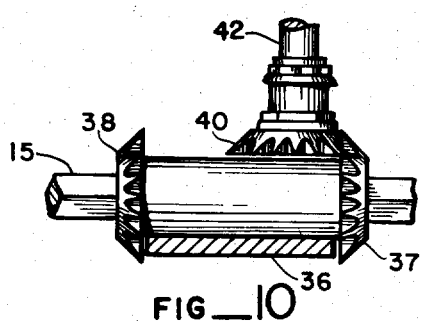
FIG_10
CLINTON P. KARR
Inventor
By Swift & Tuck
Attorneys Patented Oct. 9, 1951

2,570,456

UNITED STATES PATENT OFFICE 2,570,456

VALUE INDEXING MECHANISM

Clinton P. Karr, Seattle, Wash., assignor to Friden Calculating Machine Co., Inc., a corporation of California Application May 6, 1947, Serial No. 746,292

12 Claims. (Cl. 235—73)

My invention relates to improvements in a value index mechanism and, more particularly, to the provision in a calculating machine of mechanism for mechanically transferring back into the selector mechanism a product or the like, arrived at in the machine during a previous calculation.

In the operation of a calculating machine, the operator introduces factors into the machine through the manipulation of the keyboard and, in the course of operation of the actuating means, produces a numerical figure visible in a row of accumulator dials. It often occurs that the operator may wish to transfer that figure back into the selector mechanism for a further calculation involving that figure and another factor.

For example, the visible figure may represent the volume of sales of an item during a given period of time, which volume the operator desires to reduce by a given percentage, as in calculating gross profit on the volume. Ordinarily, to do this, the operator must read the total indicated by the accumulator dials and then manually transfer that figure into the keyboard by depressing the indicated keys. Such an operation is subject to human error, such as transposition of numerals and other mistakes and also involves time.

It is, therefore, an important object of my invention to transfer such an indicated figure to the selector elements of the calculating machine in a mechanical operation associated with the operation of clearing the accumulator dials, as when the machine is being made ready for further calculating, but without requiring the manual manipulation of the keyboard as in an operator-conducted transfer operation.

Another and important object of the invention is to provide mechanism to set the keyboard of a calculating machine with a factor, indicated by appropriate accumulator means as the result of a previous calculation, while at the same time the accumulator means is being cleared.

A further object of the invention is the provision of keyboard setting mechanism, operable upon the clearing of the accumulator dials, which is simple to construct and install and is easy to operate smoothly and efficiently.

The foregoing objects and others ancillary thereto, I prefer to accomplish as follows:

According to a preferred embodiment of my invention, I provide within the case of a calculator machine, mechanism which will operate upon the clearing of the accumulator dials to transfer a figure thereon, when desired, into the selector elements of the machine. This invention is particularly adaptable to machines of the type wherein there are gears mounted on a splined shaft and movable by operator manipulation of selecting arms, through the instrumentality of the keyboard to desired positions for engagement by tooth elements carried by rotary actuator drums. In such a machine, when a factor has been set by the placement of the movable gears, and they are turned by the actuator drums, the splined shaft revolves and, among other things, operates a series of accumulator dials to indicate a sum. Such accumulator dials are cleared at the end of a calculation by mechanism that may be manually or mechanically operated. In apparatus embodying the present invention, the clearing of the dials, i. e., returning of the dials to zero setting, is utilized to move or drive the selecting arms to positions corresponding to the value standing in the dials prior to the clearing operation. In accordance with the invention, such positioning of the selecting arms by clearing of the dials is effected under control of a selectively operable coupling mechanism interposed in a drive train extending from the dials to the selector arms. Such movement of the selector arms may be independent of the keys of the keyboard and such is preferable in most cases. With such a factor introduced into the machine, the operator may proceed to manually introduce a multiplier or a denominator or other factor into the machine and then proceed with a further calculation. Obviously, it is advantageous to effect the operation of the machine in this way to eliminate, to a certain degree, the factor of human error in making the transfer and, further, to do so more rapidly than is normally possible otherwise.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1 is a schematic perspective view of a portion of a calculating machine illustrating the manner in which my invention is incorporated;

Fig. 2 is an enlarged exploded perspective view of my selecting arm re-set mechanism;

Fig. 3 is an enlarged view of the re-set mechanism in the normal position with the gear shaft and selecting arms shown in section;

Fig. 4 is a similar view to Fig. 3, showing the re-set mechanism engaged with the gear shaft and indicating the mechanism whereby the reset gear and pinions are shifted;

Fig. 5 is a side view of the selecting arm re-set mechanism as taken on the plate of line 5—5 of Fig. 4;

Figs. 6 and 7 are views in elevation taken from the left of Fig. 1 of the key operated draw-link and the latch-bar retaining means, respectively;

Fig. 8 is a cross-sectional view taken on line 8—8 of Fig. 1;

Fig. 9 shows in plan view the rack and pinion couple between the accumulator shaft and the reset bar;

Fig. 10 is an enlarged elevational view of the add-subtract gears and pinions with portions shown in section for convenience of illustration;

Fig. 11 is a cross sectional view taken on line 11—11 of Fig. 4.

In a calculating machine of the type to which my invention is particularly applicable, there is usually provided across the machine suitable support means for various shafts, and arms and keys. Such are the rear support bar 10 and the front support and guide bar 12, which at their ends are maintained in the frame of the machine. Between bars 10 and 12 is rotatably mounted the gear shaft 14 which has an extension 15 to the rear of the bar 10. Shaft 14, 15, is square and has slidably mounted thereon the transfer or selector gears 16, 17, which are moved longitudinally of the shaft by means of forks 18, 19, respectively, that are reciprocably moved. Fig. 8 shows the engagement of fork 19 in the groove of gear 17. Fork 18 is on the rear end of selecting arm 20 and fork 19 is similarly positioned on the selecting arm 21. Arms 20 and 21 are juxtapositioned in the machine and slide in suitable grooves 22 in bar 12. Arms 20 and 21 are notched, as at 24, and selecting keys 26, 27, have cross pins 28, which engage the sloping edges of notch 24, and when depressed, produce forward movement of a selecting arm. This results in a movement of a gear such as 16 or 17 on the shaft 14 to a selected position. The selecting arm 20 is movable from its home position to any one of five operative positions, and the selector arm 21 is movable from its home position to any one of four positions.

Alongside the gear shaft 14 is an actuator drum 30 having differential actuator teeth thereon. The teeth are in two series, one series comprising nine teeth 32, the tooth 32 shown uppermost in Figure 1 being the shortest, while the three succeeding teeth are each longer by equal increments than the preceding teeth, the remaining teeth 32 all being of the same length as the fourth tooth 32. The other series comprises five teeth 32ª respectively aligned with the last five teeth 32 of the first tooth series, the teeth 32ª being all of progressively increasing length, clockwise around the drum 30 in Figure 1. The arrangement of teeth 32 and 32ª on the drum 30 and the cooperation of the teeth with selector gears 17 and 16 is described in more detail in the patent to Friden No. 2,229,889 granted January 28, 1941.

By rotation of the gears 16 or 17, the shaft 14 is turned an amount determined by the positioning of the selector gears caused by depression of a selected one of the keys 26, 27 or other similar numeral keys, not shown.

At such time as the shaft 14 is turned, the shifter bar or gate 36 moves add-subtract gears 38, 37, forward or rearward, so that one or the other meshes, as shown in Fig. 10, with the add-subtract register gear or pinion 40 on the lower end of accumulator shaft 42 which has on its upper end the accumulator dial 44. When the "plus" key is depressed the shifter 36 is moved rearwardly i. e., toward the rear of the machine as viewed by the operator using the machine, the gear 38 engages the gear 40, and the shaft 42 is turned counter-clockwise and the numbers on dial 44 advance in the usual progression (namely, 1, 2, 3, 4, etc.). The opposite occurs when the shifter is drawn forwardly (toward the front of the machine) through the depression of the "subtract" key (not shown).

Accumulator shaft 42 has a partially-toothed pinion 46 which is positioned to be engaged by rack 47 of a resetting mechanism, as illustrated in Fig. 9, carried by the re-set rack bar 48 that is moved laterally in the machine. For manual movement of rack 48, the re-set handle 49 is employed.

It will be understood that the showing of Fig. 1 is intended to be typical, since it will be obvious that a plurality of selecting keys, such as 26, 27, is associated with each of the selecting arms and that there is a plurality of gear shafts as 14 and also a plurality of actuator drums. For the purpose of illustrating my invention I have shown the means actuated in a single denominational order of selector elements, together with the mechanism for transferring the value shown on the accumulator dials after a calculation back into the selecting arms and selector gears when the accumulator dials are being re-set to "zero" and the machine made ready for a further calculation. This last operation carries out an important object of my invention which is the resetting of the selector elements to a position dictated by a predetermined total arrived at in the machine through its normal operation, and without requiring the operator to visually and manually reset the keys and selecting arms in the normal way.

On shaft 14 near its forward end I mount the bevel gear 50 to turn with the shaft. Adjacent this driving gear 50 is a normally disengaged driven bevel gear 52 which is mounted on transverse shaft 54. Bracket 56 mounted on support and guide bar 12 carries the shaft 54 and the mechanism thereon. Gear 52 moves into and out of engagement with gear 50 by sliding movement on shaft 54.

Each of the selecting arms 20—21 has an offset rack or pinion follower portion as 58, 60, carried from selecting arms 20—21, respectively, by suitable arms 62. A mutilated pinion or segment 61 is integral with the gear 52, and a mutilated pinion or segment 59 is resiliently connected to the mutilated pinion or segment 61 in a manner described hereinafter. Normally the parts 59 and 61 are disengaged from the respectively associated racks 58 and 60; but they may be moved into respective engagement with the racks to act as means for transmitting drive from the gear 52 to the racks and consequently to the setting arms 20 and 21.

In Fig. 2, wherein parts of this gear and pinion assembly are shown in exploded view, gear 52 is rigidly secured to pinion 61 and has a hollow hub 62 with its groove 64 extending therefrom toward bracket 56. A spiral or coil spring 66 is secured axially to hub 62 and its outer end is coupled by pin 68 to pinion 59. A shifter fork 70 on arm 72 is fitted to groove 64 and is resiliently coupled to hub 62 by means of the spiral or coil spring 74, as shown in Fig. 11. Arm 72 is movable in one direction to mesh gears 50 and 52 and is returned in the opposite direction to its normal position by spring 73.

For manual shifting of gear 52, I employ key 76, as in Figs. 1 and 4, which carries cross pin 78 that engages the bell-crank lever 80 coupled to arm 72. As long as key 76 is depressed, as shown in Fig. 4, the gears will be engaged and rotation of shaft 14 will result in movement of selecting arms 20, 21, through the medium of the pinions 59 and 61 and the racks 58 and 60, independently of keys 26, 27. Such movement will accomplish the positioning of the selector gears 16, 17, as previously described.

Pressure upon key 76 also produces forward movement of draw-link 82, as indicated in Fig. 6, through the action of pin 78 on the sloping edge of notch 83 formed in the draw link. This movement is translated into forward movement of shifter bar 36 to which draw-link 82 is coupled and results in the meshing of gear 37 with the add-subtract pinion 40.

A swinging latch bar 90 pivotally mounted on suitable supports 91 overlies teeth or notches 92, 93, of selecting arms 20, 21. Bar 90 is normally held out of engagement with these notches by tongue 94 of the latching link 96, which also has a cam notch 98 that is engaged by pin 78 when key 76 is depressed. Movement of the link 96 to the right, as shown in Fig. 7, against the pull of spring 97 withdraws tongue 94 from under bar 90, which is pulled down by spring 97ª. Thus, when the selecting arms are moving forwardly and the notches 92, 93, move under bar 90, the latter serves as a dog to maintain them where set until released.

Release of the selecting arms is obtained by lifting the latch bar 90 therefrom through the action of the keyboard clearing-gate (not shown) which is a reciprocal mechanism. I provide horn 100 on an arm of bar 90 and connect the horn by link 102 to the keyboard clearing-gate which, when it operates to release the keys, causes bar 90 to be raised. Thereupon tongue 94 is re-disposed under bar 90 to maintain its elevated inoperative position.

Method of operation

The operation of this invention is intended to occur after an operator has conducted a calculation in the machine with the end result or value being displayed on the series of accumulator dials of which dial 44 is typical. Normally, following such an operation, when it is desired to clear the machine, the operator shifts the rack bar 48 to the right in Fig. 1 and the teeth 47, engage the partial pinions 46 of the various accumulator shafts rotating them until the blank portions of the partial pinions 46 are all disposed toward the rack bar. At that time all the accumulator dials will have been returned or re-set to "zero." It is the rotation of these various accumulator shafts that I employ in mechanically transposing a setting back into the selector arms and gears. To do so, it is necessary to re-engage the accumulator pinion 40 with the subtract gear of the add-subtract gears carried by shiftable bar 36. I accomplish this meshing of gears 37 and 40 by imparting a draft on link 82 through depressing key 76 and causing pin 78 to act upon cam surface 83. Thus it will be seen that when the accumulator shaft 42 is rotated or partially turned, the spline shaft 14 is proportionally turned clockwise (Figure 1) in its bearings in frame members 10 and 12.

In order to employ rotation of the spline shaft 14 for the purpose of rotating the partial pinions 59 and 61, the clutch means comprising the toothed members 50 and 52 must be engaged. Since take-off member 52 is slidable on pin 54, shifting motion of member 52 toward and away from gear 50 is obtained by the shifter 72 which is simultaneously actuated with movement of the link 82 upon depression of key 76. In other words, pin 78 acts upon bell-crank 80 and causes shifter 72 to move to the left in Fig. 1, producing engagement of gears 52 and 50. Simultaneously with shifting of the bevel gear 52 to engage the bevel gear 50, the partial pinions 59 and 61 are shifted axially so as to be moved respectively into the planes of movement of the racks 58 and 60. Thereafter, when the pinions 59 and 61 are rotated they will move the respective racks 58 and 60 forwardly by amounts dependent upon the extent of rotation of the shaft 14 resulting from returning of the associated dial 44 to zero position.

First, rack 58 is thus moved to move selector arm 20 step-by-step through setting representing numerals 1, 2, 3, 4, and 5. When the latter point is reached, forward movement of the arm 20 is stopped by conventional limit means, not shown, and pinion 59 stops moving the rack 58. The teeth of partial pinion 61 then begin to engage rack 60 on selector arm 21 and to move it step by step through settings representing numerals 6, 7, 8, and 9. During such latter movement, pinion 59 is motionless due to the functioning of the torsional coupling through spring 66 between pinions 59 and 61. Shifting of the selector arms as described above, first the arm 20 and then, with delayed action, the arm 21, effects sequential movement of the selector gears relative to the teeth of actuator drum 30.

In order to maintain such positions of the selector arms and gears, the latch 90 comes into action with teeth 92 and 93 on the selector arms. Latch bar 90 is dropped due to the withdrawal of the tongue 94 from underneath, caused by depression of key 76 and the action of pin 78 on cam surface 98.

With the selector gears set as described, the operator may introduce another factor, such as a multiplier, and set the machine in operation in the usual way. The first action of the keyboard clearing gate during such an operation will result in a lifting of the latch bar 90 from the selector arm notches and permit release of the selector arms for return to their normal settings.

Although I have shown and described particular embodiments of my invention, it will occur to those skilled in the art that various changes and modifications may be made without departing from the invention.

Having thus described my invention, I claim:

1. In a calculating machine of the type wherein there are pairs of movable selector arms each coupled to a selector gear that is slidably mounted on a spline shaft so that when the selector arms are moved the gears are moved longitudinally of said spline shaft and positioned relative to a vari-toothed actuator which operates to rotate said shaft and a pair of normally disengaged add-subtract gears thereon, one of which is then meshed with an accumulator pinion to rotate an accumulator shaft and an accumulator dial thereon, which accumulator shaft is returnable to "zero" through the functioning of a rack and pinion assembly, a mechanism for transferring back to said selector of a previous calculation appearing on said accumulator dial, comprising: means for meshing the accumulator pinion with the subtract gear of said add-subtract gears; a take-off member adjacent said spline shaft; clutch means for drivingly connecting together said spline shaft and said take-off member; said clutch means comprising relatively engageable toothed clutching members; a first pinion rigidly connected to the toothed clutching member of said take-off member; a second pinion torsionally connected to said first pinion; each of said selector arms having a rack associated therewith and engageable by one of said pinions; and means for biasing one of said clutching members for shift toward and away from the other thereby to respectively control engagement and disengagement of said clutch means.

2. In a calculating machine of the type wherein there are pairs of movable selector arms each coupled to a selector gear that is slidably mounted on a spline shaft so that when the selector arms are moved the gears are moved longitudinally of said spline shaft and positioned relative to a varitoothed actuator which operates to rotate said shaft and a pair of normally disengaged add-subtract gears thereon, one of which is then meshed with an accumulator pinion to rotate an accumulator shaft and an accumulator dial thereon, which accumulator shaft is returnable to "zero" through the functioning of a re-setting mechanism, a mechanism for transferring back to said selector arms a value standing in the accumulator dial as a result of a previous calculation, comprising: means for meshing the accumulator pinion with the subtract gear of said add-subtract gears; a take-off member adjacent said spline shaft; optionally engageable means for drivingly connecting together said spline shaft and said take-off member; a first pinion rigidly connected to said take-off member; a second pinion torsionally connected to said first pinion; each of said selector arms having a rack associated therewith and engageable by one of said pinions; and means for controlling engagement and disengagement of said optionally engageable means.

3. A calculating mechanism including, for each of a plurality of denominational orders, differential actuator means; a register gear; means including reversing gearing for transmitting value entering drive from said actuator means to said register gear; means for setting said actuator means differentially according to the value to be entered in said register gear; registration sign control means for selectively adjusting said reversing gearing for additive or subtractive sign character registration; means for re-setting said register gear to zero position; and means for transferring a value registered by the position of said register gear back to said setting means comprising: shiftable drive means interposed between said reversing gearing and said setting means and normally being operatively disconnected from both said reversing gearing and said setting means; means for shifting said drive means to effect connection thereof to both said reversing gearing and said setting means whereby to move said setting means proportionately to rotary movement of said reversing gearing; means for operating said sign control means to adjust said reversing gearing for a particular sign character registration; a control device; means responsive to operation of said control device for operating said shifting means to effect connection of said drive means to both said reversing gearing and said setting means; and means also responsive to operation of said control device for actuating said sign control operating means, whereby, when said control device has been actuated, re-setting of said register gear to zero position will act through said reversing gearing and said drive means to position the setting means correspondingly to the value registered by the position of said register gear prior to the re-setting movement thereof.

4. A calculating mechanism including, for each of a plurality of denominational orders, a rotary differential actuator; selector gear means; means for setting said selector gear means differentially with respect to said actuator; a register gear; drive means including reversing gearing operatively connecting said selector gear means with said register gear; registration sign control means for selectively adjusting said reversing gearing for additive or subtractive sign character registration; means for re-setting said register gear to zero position; and means for transferring a value registered by the position of said register gear back to the selector gear setting means comprising: shiftable drive means interposed between said reversing gearing and said setting means and normally being operatively disconnected from both said reversing gearing and said setting means; means for shifting said drive means to effect connection thereof to both said reversing gearing and said setting means whereby to move said setting means proportionately to rotary movement of said reversing gearing; means for operating said sign control means to adjust said reversing gearing for a particular sign character registration; a control device; means responsive to operation of said control device for operating said shifting means to effect connection of said drive means to both said reversing gearing and said setting means; and means also responsive to operation of said control device for actuating said sign control operating means, whereby, when said control device has been actuated, re-setting of said register gear to zero position will act through said reversing gearing and said drive means to position the setting means correspondingly to the value registered by the position of said register gear prior to the re-setting movement thereof.

5. A calculating mechanism including, for each of a plurality of denominational orders, a rotary differential actuator; selector gear means; means for setting said selector gear means differentially with respect to said actuator; a register gear; drive means including reversing gearing operatively connecting said selector gear means with said register gear; registration sign control means for selectively adjusting said reversing gearing for additive or subtractive sign character registration; means for re-setting said register gear to zero position; and means for transferring a value registered by the position of said register gear back to the selector gear setting means comprising: a driving gear rotatable by said reversing gearing; a drivable gear; means for maintaining said driving gear and said drivable gear normally disengaged but being operable for engaging them; normally disengaged transmitting means adapted to be engaged for operatively connecting said drivable gear to said setting means whereby upon engagement of said driving gear and said drivable gear, engagement of said transmitting means, and rotation of said drivable gear, said setting means will be moved proportionately to rotary movement of said reversing gearing;

means for operating said sign control means to adjust said reversing gearing for a particular sign character registration; a control device; means responsive to operation of said control device for effecting engagement of said driving gear and said drivable gear and engagement of said transmitting means; and means also responsive to operation of said control device for actuating said sign control operating means, whereby, when said control device has been actuated, re-setting of said register gear to zero position will act through said reversing gearing, said driving gear, said drivable gear, and said transmitting means to position the setting means correspondingly to the value registered by the position of said register gear prior to the re-setting movement thereof.

6. A calculating mechanism including, for each of a plurality of denominational orders, a rotary differential actuator; selector gear means; means for setting said selector gear means differentially with respect to said actuator; a register gear; drive means including reversing gearing operatively connecting said selector gear means with said register gear; registration sign control means for selectively adjusting said reversing gearing for additive or subtractive sign character registration; means for re-setting said register gear to zero position; and means for transferring a value registered by the position of said register gear back to the selector gear setting means comprising: a driving gear rotatable by said reversing gearing; a drivable gear normally disengaged from said driving gear; means including a rockable lever for moving said drivable gear into engagement with said driving gear; means operatively connecting said drivable gear to said setting means whereby rotation of said drivable gear will cause said setting means to be moved proportionately to rotary movement of said reversing gearing; a shiftable link for operating said sign control means to adjust said reversing gearing for a particular sign character registration, said link having a sloping edge; a depressible key; and a pin on said key operable upon depression of the key for rocking said lever and engaging said link sloping edge to operate said link, whereby, when said key has been depressed, re-setting of said register gear to zero position will act through said reversing gearing, said driving gear, and said drivable gear to position the setting means correspondingly to the value registered by the position of said register gear prior to the re-setting movement thereof.

7. A calculating mechanism including, for each of a plurality of denominational orders, a rotary differential actuator; selector gear means; means for setting said selector gear means differentially with respect to said actuator; a register gear; drive means including reversing gearing operatively connecting said selector gear means with said register gear; registration sign control means for selectively adjusting said reversing gearing for additive or subtractive sign character registration; means for re-setting said register gear to zero position; and means for transferring a value registered by the position of said register gear back to the selector gear setting means comprising: normally disengaged but optionally engageable drive means interposed between said reversing gearing and said setting means and operative, when engaged, for moving said setting means proportionately to rotary movement of said reversing gearing; means for operating said sign control means to adjust said reversing gearing for a particular sign character registration; a control device; means responsive to operation of said control device for effecting engagement of said drive means; means also responsive to operation of said control device for actuating said sign control operating means, whereby, when said control device has been actuated, re-setting of said register gear to zero position will act through said reversing gearing and said drive means to position the setting means correspondingly to the value registered by the position of said register gear prior to the re-setting movement thereof; a ratchet device normally disengaged from said setting means; and means operable under control of said control device for effecting engagement of said ratchet device with said setting means when said drive means is engaged in consequence of said control device being in actuated position, whereby said setting means will be held in the position to which it is set by re-setting of the register.

8. A calculating machine including, for each of a plurality of denominational orders, a shaft; a register gear; means including reversing gearing for transmitting value entering drive from said shaft to said register gear; a differential actuator; selecting means including a first selector device for driving said shaft and being adjustable relatively to said actuator to engage it and be driven thereby differentially according to the adjustment of said device, and a second selector device for driving said shaft and being adjustable relatively to said actuator to engage it and be driven thereby differentially according to the adjustment of said second device; and means responsive to re-setting of said register gear to zero position with said reversing gearing set for negative registration for adjusting said selecting means correspondingly to the value registered by said register gear prior to the re-setting operation comprising reverse drive take-off means, optionally engageable means for drivingly connecting said take-off means to said shaft, a yieldable driving connection between said first selector device and said take-off means, a delayed action driving connection between said second selector device and said take-off means, and means for controlling engagement and disengagement of said optionally engageable means.

9. A calculating machine including, for each of a plurality of denominational orders, a shaft; a register gear; means including reversing gearing for transmitting value entering drive from said shaft to said register gear; a differential actuator; selecting means including a first selector device for driving said shaft and being adjustable relatively to said actuator to engage it and be driven thereby differentially according to the adjustment of said device, and a second selector device for driving said shaft and being adjustable relatively to said actuator to engage it and be driven thereby differentially according to the adjustment of said second device; and means responsive to re-setting of said register gear to zero position with said reversing gearing set for negative registration for adjusting said selecting means correspondingly to the value registered by said register gear prior to the re-setting operation comprising a rotatable reverse drive take-off member, optionally engageable means for drivingly connecting said take-off member to said shaft, a first pinion drivable by said take-off member, a first pinion follower drivable by said first pinion and being connected to said first selector device, a second and mutilated pinion drivable by said take-off member, a second pinion follower drivable by said second pinion and being connected to said second selector device, the teeth on said second pinion being so positioned as to engage said second pinion follower with a delayed action after operation of said first follower by said first pinion, whereby operation of said take-off member effects sequential differential adjustment of said selector devices, and means for controlling engagement and disengagement of said optionally engageable means.

10. A calculating mechanism including, for each of a plurality of denominational orders, a rotary differential actuator; selector gear means; means for setting said selector gear means differentially with respect to said actuator; a register gear; drive means including reversing gearing operatively connecting said selector gear means with said register gear; registration sign control means for selectively adjusting said reversing gearing for additive or subtractive sign character registration; means for re-setting said register gear to zero position; and means for transferring a value registered by the position of said register gear back to the selector gear setting means comprising: normally disengaged but optionally engageable drive means interposed between said reversing gearing and said setting means and operative, when engaged, for moving said setting means proportionately to rotary movement of said reversing gearing; means for operating said sign control means to adjust said reversing gearing for a particular sign character registration; a control device; means responsive to operation of said control device for effecting engagement of said drive means; means also responsive to operation of said control device for actuating said sign control operating means, whereby, when said control device has been actuated, re-setting of said register gear to zero position will act through said reversing gearing and said drive means to position the setting means correspondingly to the value registered by the position of said register gear prior to the re-setting movement thereof; ratchet teeth on said setting means; a spring-urged latch cooperable with said ratchet teeth; a member normally holding said latch disengaged from said ratchet teeth against the urge of the latch spring; and means operable by said control device for disabling said holding member to enable said latch to engage said ratchet teeth so as to cooperate therewith in holding said setting means in the position to which it is moved by re-setting of the register.

11. A calculating mechanism including, for each of a plurality of denominational orders, a rotatable vari-toothed actuator, a spline shaft, two selector gears slidably mounted on said shaft to be movable longitudinally thereof for being drivingly engaged differentially by said actuator, selector arms coupled respectively with said selector gears for moving them individually along said shaft, an accumulator pinion, an accumulator dial drivable by said pinion, a pair of add-subtract gears drivable by said shaft and being selectively engageable with said accumulator pinion, and means for setting said accumulator pinion to zero position; in combination with a mechanism for transferring back to said selector arms a result of a previous calculation appearing on said accumulator dial, comprising: means for meshing the accumulator pinion with the subtract gear of said add-subtract gears; a take-off shaft adjacent said spline shaft; a pair of normally disengaged bevel gears for operatively connecting said spline shaft to said take-off shaft; means for engaging said bevel gears; a single manually operable key for operating said pinion and subtract gear meshing means and for engaging said bevel gears; and rack and pinion means operatively connecting said take-off shaft to said selector arms to move said arms so that the sum of the respective movements thereof is proportional to the rotation of the spline shaft during re-setting of the accumulator dial to "zero."

12. Mechanism as set forth in claim 11 including latch means for retaining said selector arms in the positions to which they are moved by said rack and pinion means.

CLINTON P. KARR.

REFERENCES CITED

The following references are of record in the file of this patent:

UNITED STATES PATENTS

| Number | Name | Date |
|---|---|---|
| 1,590,920 | Wernecke | June 29, 1926 |
| 1,941,309 | Koch | Dec. 26, 1933 |
| 2,305,780 | Henzelmann | Dec. 22, 1942 |
| 2,327,981 | Friden | Aug. 31, 1943 |

FOREIGN PATENTS

| Number | Country | Date |
|---|---|---|
| 602,353 | Germany | Sept. 8, 1934 |
| 106,182 | Sweden | Dec. 22, 1942 |
| 218,923 | Switzerland | Sept. 16, 1947 |

Certificate of Correction

Patent No. 2,570,456 October 9, 1951

CLINTON P. KARR

It is hereby certified that error appears in the above numbered patent requiring correction as follows:

In the heading to the drawings, sheets 1 to 3 inclusive, line 2, for "VALVE INDEXING MECHANISM" read *VALUE INDEXING MECHANISM*; in the printed specification, column 1, line 2, for "index" read *indexing*; column 3, line 5, for "plate" read *plane*;

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*